(12) United States Patent
Smolinski et al.

(10) Patent No.: US 9,721,362 B2
(45) Date of Patent: Aug. 1, 2017

(54) AUTO-COMPLETION OF PARTIAL LINE PATTERN

(71) Applicant: Microsoft Technology Licensing, LLC, Redmond, WA (US)

(72) Inventors: Adam Smolinski, North Bend, WA (US); Michael John Ebstyne, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 621 days.

(21) Appl. No.: 13/869,816

(22) Filed: Apr. 24, 2013

(65) Prior Publication Data

US 2014/0325405 A1    Oct. 30, 2014

(51) Int. Cl.
*G06T 11/20* (2006.01)
*G06K 9/00* (2006.01)
*G06K 9/46* (2006.01)
*G06F 17/30* (2006.01)

(52) U.S. Cl.
CPC ...... *G06T 11/203* (2013.01); *G06F 17/30277* (2013.01); *G06K 9/0055* (2013.01); *G06K 9/00436* (2013.01); *G06K 9/4609* (2013.01); *G06K 9/468* (2013.01)

(58) Field of Classification Search
CPC ............. G06K 9/00436; G06K 9/0055; G06K 9/4609; G06K 9/468; G06F 17/30244; G06T 11/20; G06T 11/203
See application file for complete search history.

(56) References Cited

U.S. PATENT DOCUMENTS

| | | | |
|---|---|---|---|
| 4,542,526 A | | 9/1985 | Satoh et al. |
| 5,204,915 A | * | 4/1993 | Nishida ........................ 382/198 |
| 5,428,692 A | | 6/1995 | Kuehl |
| 5,640,607 A | | 6/1997 | Murray |

(Continued)

FOREIGN PATENT DOCUMENTS

EP        1229488 A2      8/2002

OTHER PUBLICATIONS

International Search Report & Written Opinion for PCT Patent Application No. PCT/US2014/034848, Mailed Date: Jul. 24, 2014, Filed Date: Apr. 22, 2014, 10 Pages.

(Continued)

*Primary Examiner* — Jeffrey A Gaffin
*Assistant Examiner* — Mandrita Brahmachari
(74) *Attorney, Agent, or Firm* — Workman Nydegger

(57) ABSTRACT

Auto-completion of an input partial line pattern. Upon detecting that the user has input the partial line pattern, the scope of the input partial line pattern is matched against corresponding line patterns from a collection of line pattern representations to form a scoped match set of line pattern representations. For one or more of the line pattern representations in the scoped match set, a visualization of completion options is then provided. For example, the corresponding line pattern representation might be displayed in a distinct portion of the display as compared to the input partial line pattern, or perhaps in the same portion in which case, in which case the remaining portion of the line pattern representation might extend off of the input partial line pattern representation.

19 Claims, 8 Drawing Sheets

(56) References Cited

U.S. PATENT DOCUMENTS

| | | | |
|---|---|---|---|
| 5,926,566 A * | 7/1999 | Wang | G06F 3/018 |
| | | | 382/185 |
| 6,141,454 A | 10/2000 | Seymour et al. | |
| 6,628,279 B1 | 9/2003 | Schell et al. | |
| 7,137,076 B2 | 11/2006 | Iwema et al. | |
| 7,242,805 B1 | 7/2007 | Reihani | |
| 7,557,803 B2 | 7/2009 | Furukawa et al. | |
| 7,630,962 B2 | 12/2009 | Napper et al. | |
| 8,094,920 B2 | 1/2012 | Sugiyama et al. | |
| 8,179,604 B1 | 5/2012 | Prada Gomez et al. | |
| 8,514,178 B2 | 8/2013 | Song et al. | |
| 8,515,153 B2 | 8/2013 | Sugiyama et al. | |
| 9,189,825 B2 | 11/2015 | Im et al. | |
| 2002/0075286 A1 | 6/2002 | Yonezawa et al. | |
| 2002/0128796 A1 | 9/2002 | Matsutani | |
| 2003/0185445 A1 | 10/2003 | Chang et al. | |
| 2005/0271252 A1 | 12/2005 | Yamada | |
| 2005/0275622 A1 | 12/2005 | Patel et al. | |
| 2006/0007188 A1 | 1/2006 | Reiner | |
| 2006/0010141 A1 | 1/2006 | Furukawa et al. | |
| 2006/0013483 A1 | 1/2006 | Kurzweil et al. | |
| 2007/0098289 A1 | 5/2007 | Kondo et al. | |
| 2007/0173240 A1 * | 7/2007 | Lim | 455/418 |
| 2008/0013793 A1 | 1/2008 | Hillis et al. | |
| 2008/0091713 A1 | 4/2008 | Candelore et al. | |
| 2008/0170776 A1 | 7/2008 | Albertson et al. | |
| 2008/0304721 A1 | 12/2008 | Wu et al. | |
| 2009/0278848 A1 * | 11/2009 | Robertson | G06T 11/206 |
| | | | 345/440.2 |
| 2009/0324076 A1 * | 12/2009 | Kolmykov-Zotov | G06K 9/00409 |
| | | | 382/170 |
| 2010/0104134 A1 | 4/2010 | Wang et al. | |
| 2010/0225599 A1 * | 9/2010 | Danielsson | G06F 3/0237 |
| | | | 345/173 |
| 2010/0278453 A1 | 11/2010 | King | |
| 2010/0302164 A1 * | 12/2010 | Pienimaa | G06F 3/018 |
| | | | 345/168 |
| 2010/0328201 A1 | 12/2010 | Marvit et al. | |
| 2011/0252381 A1 | 10/2011 | Chaudhri | |
| 2012/0069027 A1 * | 3/2012 | Yamazaki et al. | 345/472.3 |
| 2012/0131520 A1 | 5/2012 | Tang et al. | |
| 2012/0144335 A1 | 6/2012 | Abeln et al. | |
| 2012/0197857 A1 | 8/2012 | Huang et al. | |
| 2012/0229468 A1 * | 9/2012 | Lee | G06F 9/4443 |
| | | | 345/440 |
| 2012/0256926 A1 | 10/2012 | Jimenez et al. | |

OTHER PUBLICATIONS

Keogh, et al., "Relevance Feedback Retrieval of Time Series Data", In Proceedings of the 22nd Annual International ACM SIGIR Conference on Research and Development in Information Retrieval, Aug. 1, 1999, pp. 183-190.

Ryall, et al., "QueryLines: Approximate Query for Visual Browsing" In Proceedings of Extended Abstracts on Human Factors in Computing Systems, Apr. 2, 2005, pp. 1765-1768.

Wattenberg, Martin, "Sketching a Graph to Query a Time-Series Database", In Proceedings of Extended Abstracts on Human Factors in Computing Systems, Mar. 31, 2001, pp. 381-382.

Tirkaz, et al., "Sketched Symbol Recognition with Auto-Completion", In Journal Pattern Recognition, A Elsevier Science Inc. Publication, vol. 45, Issue 11, Apr. 25, 2012, pp. 3926-3937.

U.S. Appl. No. 13/869,771, filed Apr. 24, 2013, Smolinski et al.

U.S. Appl. No. 13/869,835, filed Apr. 24, 2013, Smolinski et al.

"International Search Report & Written Opinion for PCT Patent Application No. PCT/US2014/034850", Mailed Date: Jul. 18, 2014, Filed Date: Apr. 22, 2014, 12 Pages.

"Adobe Photoshop Help and Tutorials", Adobe, Feb. 1, 2013, pp. 226-228.

International Search Report & Written Opinion for PCT Patent Application No. PCT/US2014/034849, Mailed Date: Jul. 17, 2014, Filed Date: Apr. 22, 2014, 10 pages.

Walny, et al., "Understanding Pen and Touch Interaction for Data Exploration on Interactive Whiteboards", In IEEE Transactions on Visualization and Computer Graphics, Dec. 2012, 10 pages.

Idreos, et al., "dbTouch: Analytics at your Fingertips", In Proceedings of 6th Biennial Conference on Innovative Data Systems Research, Jan. 6, 2013, 11 pages.

Holz, et al., "Relaxed Selection Techniques for Querying Time-Series Graphs", In Proceedings of the 22nd Annual ACM Symposium on User Interface Software and Technology, Oct. 4, 2009, 10 pages.

Utsumi, et al., "Direct Manipulation Interface using Multiple Cameras for Hand Gesture Recognition", Multimedia Computing and Systems, IEEE Conference Proceedings (Jun. 1998), pp. 264-267.

U.S. Appl. No. 13/869,771, Jun. 18, 2015, Office Action.

Notice of Allowance dated Oct. 5, 2015 cited in U.S. Appl. No. 13/869,835.

International Preliminary Report on Patentability Issued in PCT Application No. PCT/US2014/034848, Mailed Date: Aug. 14, 2015, 9 Pages.

Notice of Allowance dated Dec. 10, 2015 cited in U.S. Appl. No. 13/869,771.

\* cited by examiner

400 ial line pattern representation.

AUTO-COMPLETION OF PARTIAL LINE PATTERN

BACKGROUND

The information age is characterized by the widespread availability of information made possible through network communication. However, the mass of available information often makes it difficult to extract data of interest. Because of the potentially laborious nature of extracting valuable data from large amounts of less valuable information, the labor is often referred to as "data mining". Less valuable or irrelevant information is analogous to raw earth that must be sifted through in order to find valuable minerals, which are analogous to relevant information.

One way to extract information is to submit queries on databases. This method lends itself well to data that has identified properties that are monitored by the database. However, there is a wide variety of ways in which data can be stored. Some types of data, such as time series charts, are not quite as easy to sift through as they can often represent complex line representations that do not lend themselves well subject to database queries.

BRIEF SUMMARY

At least some embodiments described herein relate to performing auto-completion of an input partial line pattern. Upon detecting that the user has input the partial line pattern, the scope of the input partial line pattern is matched against corresponding line patterns from a collection of line pattern representations to form a scoped match set of line pattern representations. For instance, if the first half of an input line pattern representation is input, those line pattern representations that match for that first half are within the scoped match set. For one or more of the line pattern representations in the scoped match set, a visualization of completion options is then provided. For example, the corresponding line pattern representation might be displayed in a distinct portion of the display as compared to the input partial line pattern, or perhaps in the same portion in which case, in which case the remaining portion of the line pattern representation might extend off of the input partial line pattern representation.

In some cases, this process may be performed continuously or frequently as the input line pattern representation is being drawn, such that as the user enters more of the input line pattern representation, the matched set (and completion options) changes, perhaps even substantially in real time.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

Figure 1:
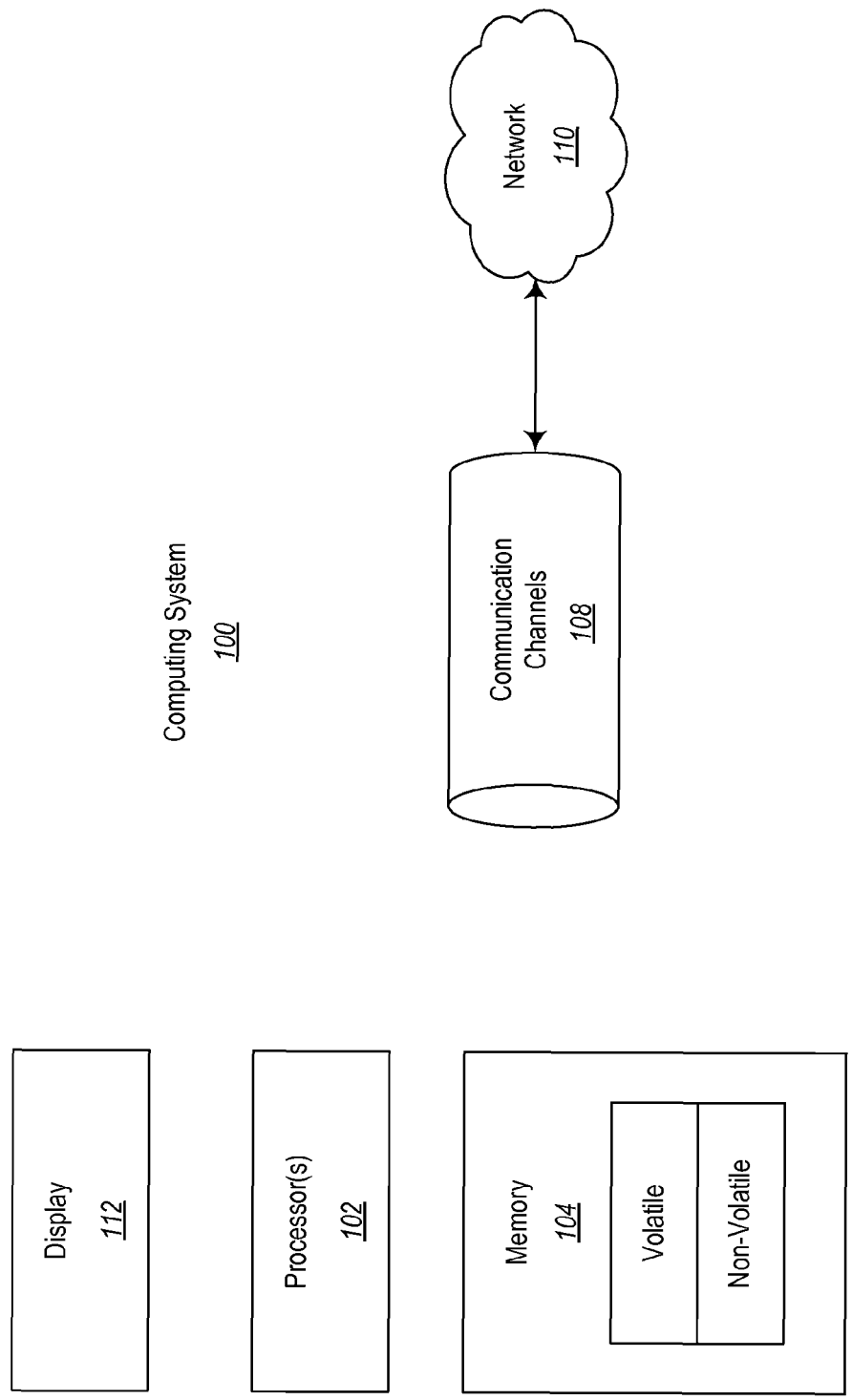
FIG. 1 abstractly illustrates a computing system in which some embodiments described herein may be employed.

At least some embodiments described herein relate to performing auto-completion of an input partial line pattern. Upon detecting that the user has input the partial line pattern, the scope of the input partial line pattern is matched against corresponding line patterns from a collection of line pattern representations to form a scoped match set of line pattern representations. For one or more of the line pattern representations in the scoped match set, a visualization of completion options is then provided. For example, the corresponding line pattern representation might be displayed in a distinct portion of the display as compared to the input partial line pattern, or perhaps in the same portion, in which case the remaining portion of the line pattern representation might extend off of the input partial line pattern.

In some cases, this process may be performed continuously or frequently as the input line pattern representation is being drawn, such that as the user enters more of the input line pattern representation, the matched set (and completion options) changes, perhaps even substantially in real time. This might be performed in real-time even for large collections of line patterns if the process of matching the input line pattern representation against each of the line pattern representation of the collection is efficient.

As described herein, this process may indeed be made efficient by encoding each of the line pattern representation. The line pattern representation has a changing value in a first dimension (e.g., along the vertical or "y" axis) as a function of a value in a second dimension (e.g., along the horizontal or "x" axis). The line pattern representation is segmented into multiple segments along the second dimension. The line pattern representation is then encoded by assigning a quantized value to each of the segments based on the changing value of the line pattern in the first dimension as present within the corresponding segment. For instance, the line pattern representation may also be divided into multiple ranges along the first dimension. If the line pattern generally falls within a given range (e.g., if the mean of the line pattern is within the given range) within a segment, the segment will be assigned a quantized value corresponding to that given range.

Some introductory discussion of a computing system will be described with respect to FIG. 1. Then, the general principles of auto-completion of line pattern representations will be described with respect to FIGS. 2 through 5. In conclusion, the encoding of the line pattern representations for particularly efficient matching of the input partial line pattern to each of the line pattern representations in the collection will be described with respect to FIGS. 6 through 9.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 also includes a display 112, which may be used to display visual representations to a user.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
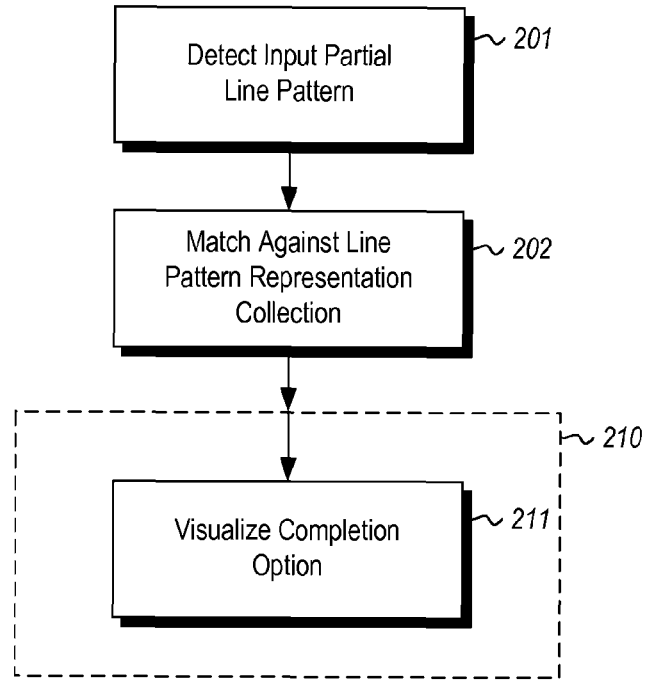
FIG. 2 illustrates a flowchart of a method for initiating auto-completion of an input partial line pattern in response to detecting the input partial line pattern input by a user.

FIG. 2 illustrates a flowchart of a method 200 for initiating auto-completion of an input partial line pattern in response to detecting the input partial line pattern input by a user. This initiating provides a selectable completion option for each of one or more matching line pattern representations in a collection of line pattern representations. Upon detecting that the input partial line pattern has been input by a user (act 201), the scope of the input partial line pattern is matched against a corresponding partial line patterns of each of a collection of line pattern representations to find a scope matched set of one or more line pattern representations (act 202). The content of box 210 may then be performed multiple times for multiple line pattern representations of the scoped match set. In particular, a completion option is visualized (act 211) for the corresponding line pattern representation of the scoped matched set.

Figure 3:
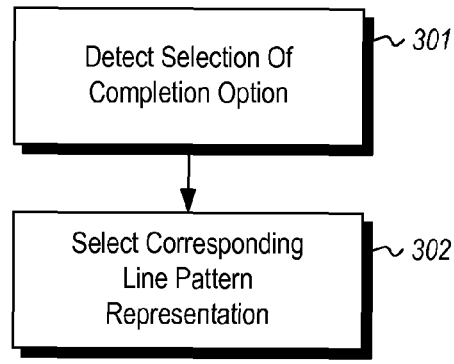
FIG. 3 illustrates a flowchart for completing the auto-completion processes.

FIG. 3 illustrates a flowchart of a method 300 for completing the auto-completion processes. In particular, upon detecting that the user has selected a completion option visualization (act 301) generated by the method 200 of FIG. 2, the corresponding line pattern representation is selected (act 302).

Figure 4:
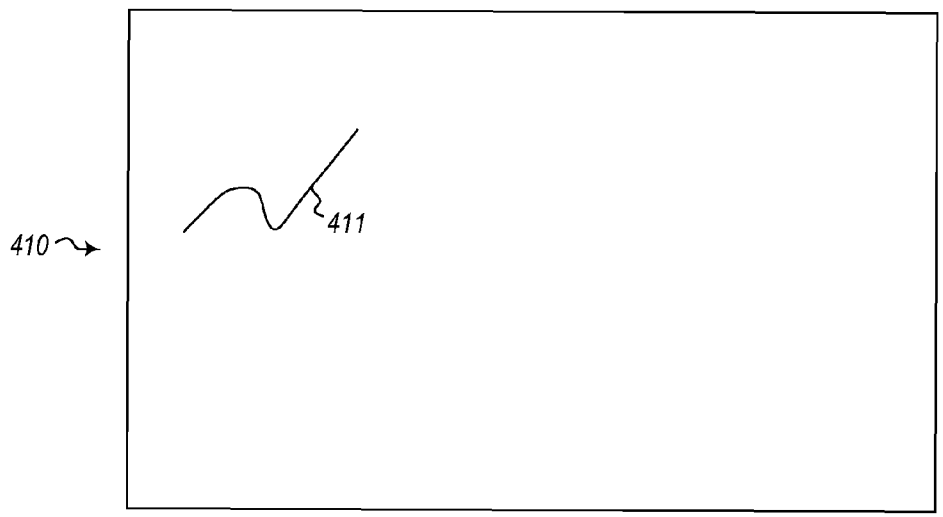
FIG. 4 illustrates a portion of a user interface that includes an input portion in which the input partial line pattern is input and a completion options portion in which the completion options are illustrated.
Figure 4:
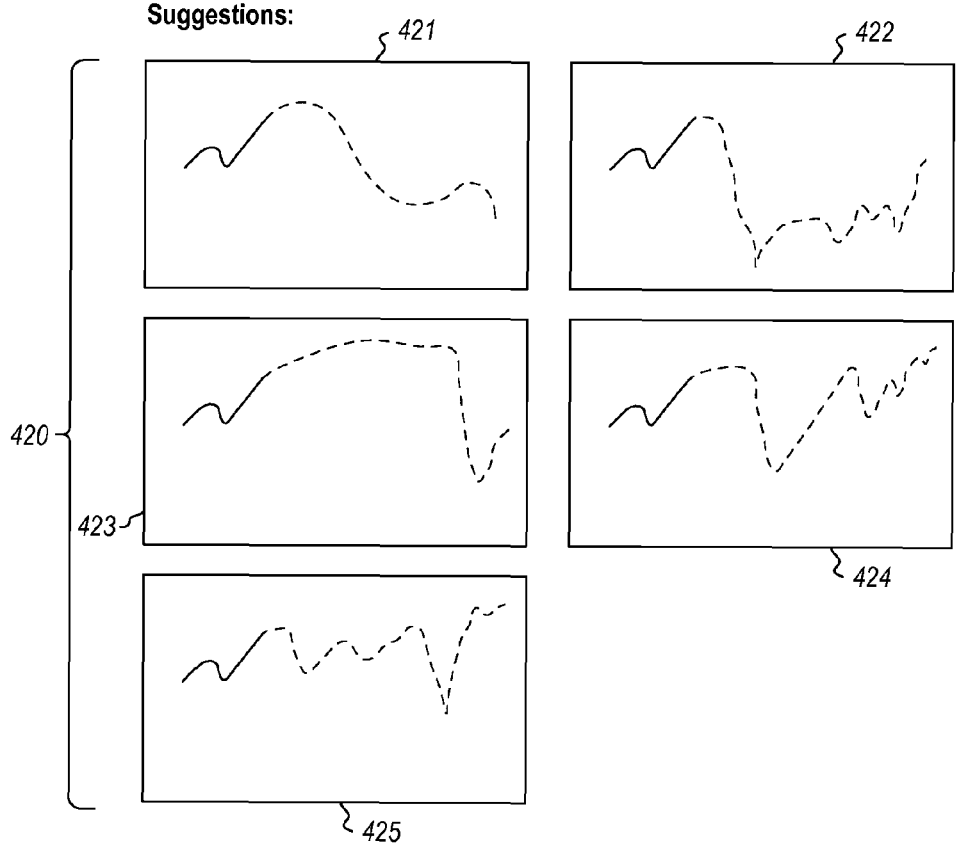

The completion options might be displayed by displaying the corresponding line pattern representations of the scoped match set in a distinct portion of the display 112 as compared to the portion of the display in which the input partial line pattern is inputted by the user. For instance, FIG. 4 illustrates a portion 400 of a user interface that includes an input portion 410 and a completion options portion 420. The user has entered an input partial line pattern representation 411. In response, scoped matched line pattern representations 421 through 425 are illustrated in the completion options portion 420. Each scoped match line pattern representations shows the input partial line pattern (in solid line) followed by a portion of the corresponding line pattern representation that falls outside of the scope extending from the input partial line pattern representation (in dashed line).

Figure 5:
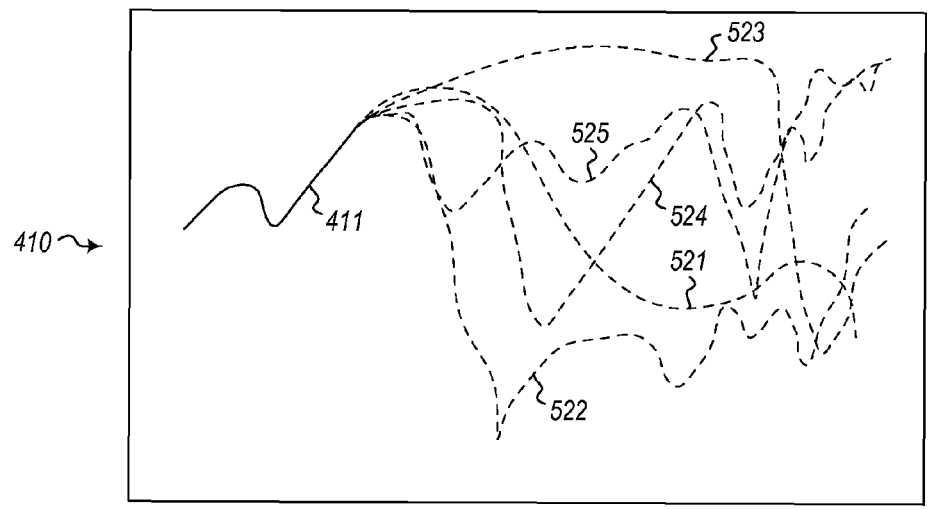
FIG. 5 illustrates a portion of a user interface that is similar to FIG. 4, except that completion options are further illustrated in the input portion with the corresponding line pattern representation outside of the input scope shown extended from the input partial line pattern representation.
Figure 5:
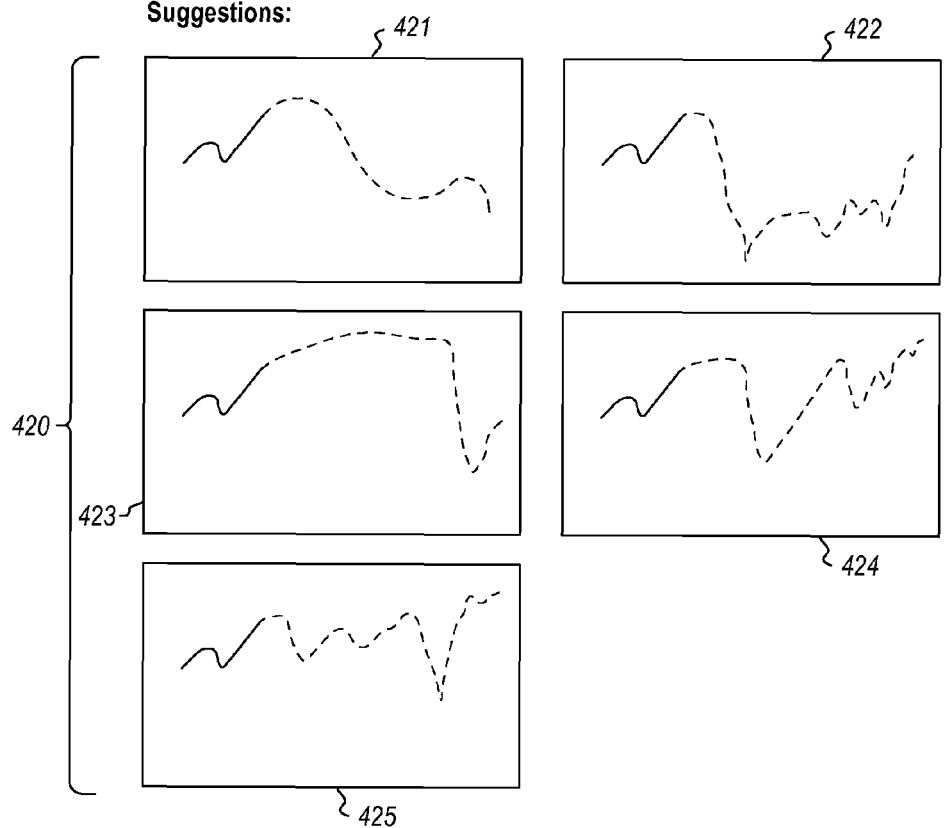

Alternatively or in addition, the completion options may be represented by displaying the corresponding line pattern representation of the scoped match set within a same portion of the display as the input partial line pattern representation is displayed. For instance, the portion of the corresponding line pattern representation that is outside of the scope of what has been input so far extends from the input partial line pattern representation. For instance, FIG. 5 illustrates a user interface 500 that is similar to FIG. 4, except that the completion options are also displayed within the input portion 410 itself, with the line pattern representation 521 through 525 that falls outside of the scope of the input partial line pattern extending from the input partial line pattern.

In some embodiments, this matching operation might be efficiently performed by performing the encoding process described with respect to FIGS. 6 through 9. The encoding process may be performed on the entirety of each of the line pattern representations in the collection in advance of the user entering the input partial line pattern. Thus, associated with each of the line pattern representations is the associated encoding resulting from FIGS. 6 through 9.

Figure 6:
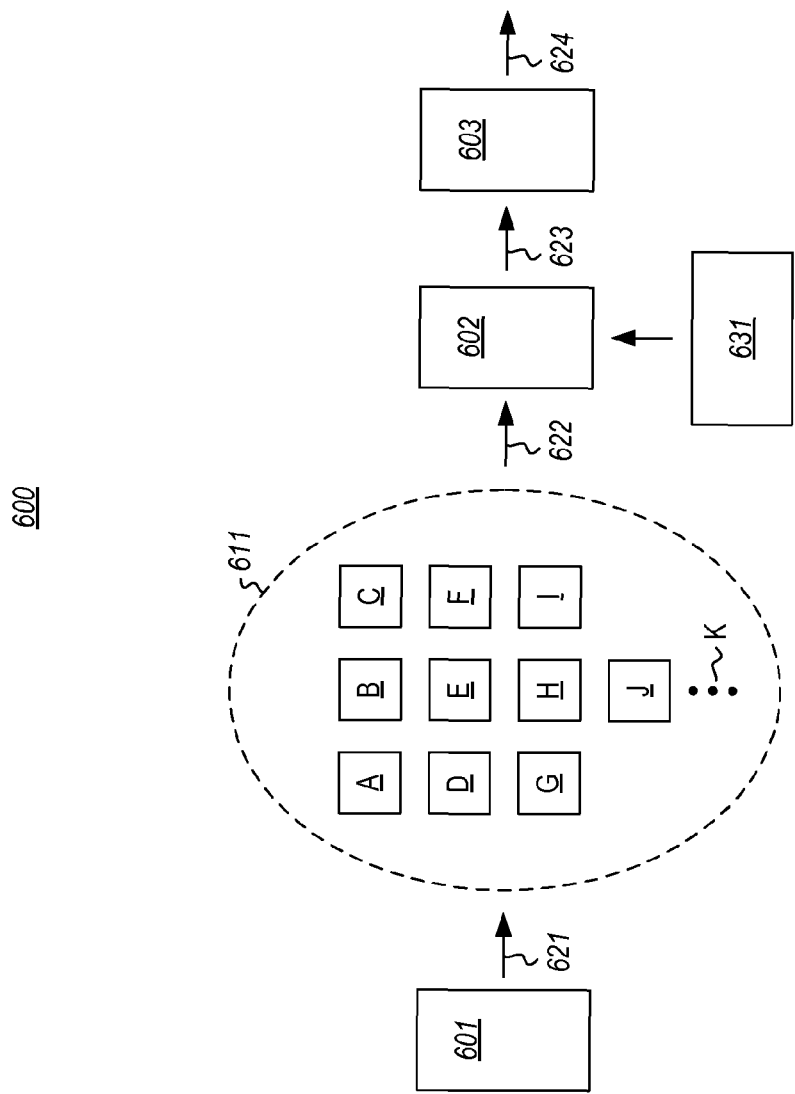
FIG. 6 illustrates a system that encodes each of multiple line pattern representations.
Figure 7:
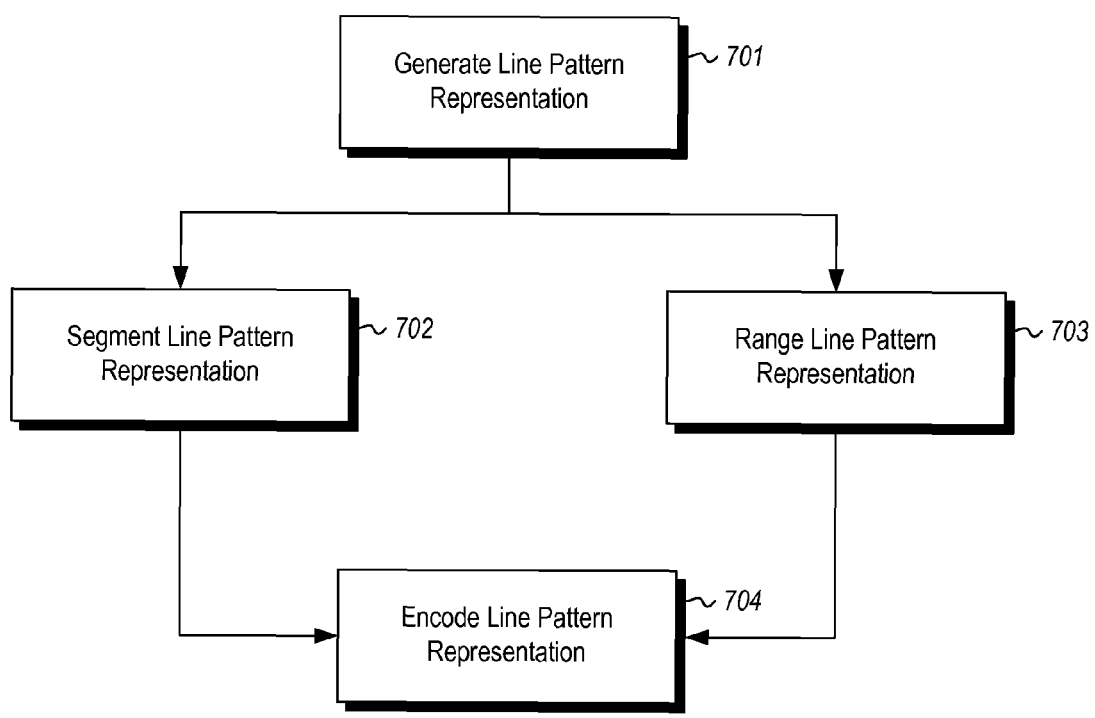
FIG. 7 illustrates a flowchart of a method for encoding line pattern representations.

FIG. 6 illustrates a system 600 that encodes each of multiple line pattern representations, and uses the encoding to categorize the line pattern representations. FIG. 7 illustrates a flowchart of a method 700 for encoding line pattern representations. As the method 700 of FIG. 7 may be performed by the system 600 of FIG. 6, the description of FIGS. 6 and 7 will now proceed in an intermingled fashion. The method 700 may be performed for each of line pattern representations in the collection.

The system 600 includes a pattern generation component 601, which generates one or more line pattern representations (act 701 in FIG. 7), each representing a line pattern having a changing value in the first dimension as a function of a value in a second dimension. The line pattern representation may be generated based on underlying data accessible (either locally or remotely) to the pattern generation component 601. Examples of line patterns include, for example, time series charts, log series data, usage charts, activity charts, and so forth. As very specific examples, such charts might allow a user to quickly evaluate any type of information such as example call patterns, data center operations, social media response (e.g., number of tweets) regarding a particular actor before and after an academy award event, and so forth.

In FIG. 6, the pattern generation component 601 generates (as represented by arrow 621) a set 611 of line pattern representations represented symbolically as A through J in FIG. 6. Although 10 line pattern representations A though J are illustrated in FIG. 6, the ellipses K symbolically represents that there is no limit to the number of line pattern representations generated by the pattern generation component 601 to form the collection. There may be up to thousands or even millions or more of line pattern representations. As previously mentioned, one of the advantages of embodiments described herein is the ability to encode large numbers of line pattern representations in a relatively short period of time to enable more real time auto-completion of the input partial line pattern.

Figure 8:
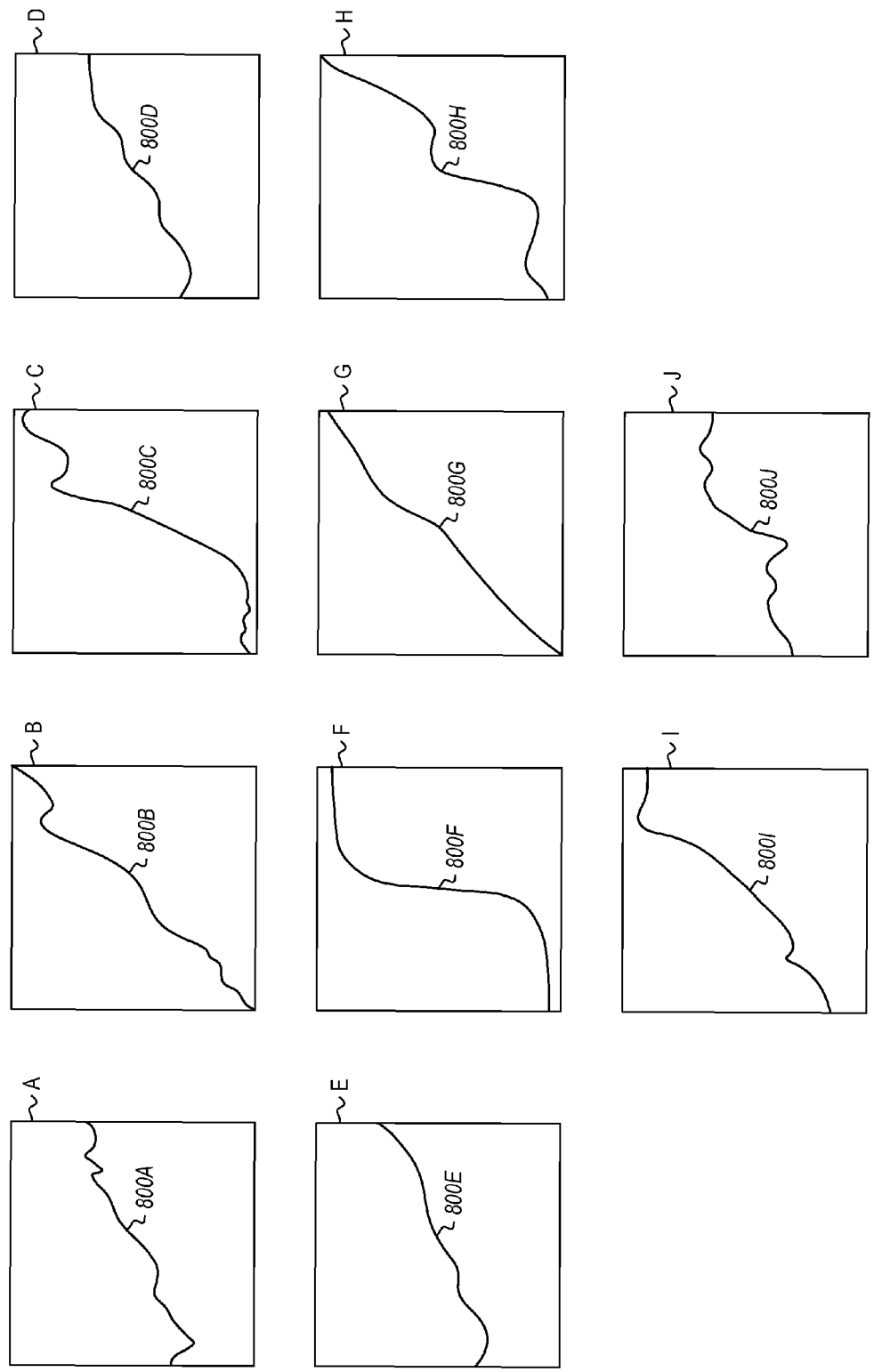
FIG. 8 illustrates a number of example line pattern representations used as a specific example of how the principles described herein may be employed.

FIG. 8 illustrates example line pattern representations A through J in further detail including corresponding represented line pattern 800A through 800J. These line pattern representations will be referred to as a single example, although the principles described herein are applicable to any set of line pattern representations regardless of the line patterns themselves, and regardless of the number of line pattern representations. Nevertheless, the example line pattern representations A though J of FIG. 8 will be a helpful and specific study that will illuminate the more general principles that are not limited to this example. In the case of FIG. 8, the first dimension (along which the line pattern value varies) is the vertical dimension often referred to as the "y axis", whereas the second dimension (representing the input value) is the horizontal axis often referred to as the "x axis".

Figure 9:
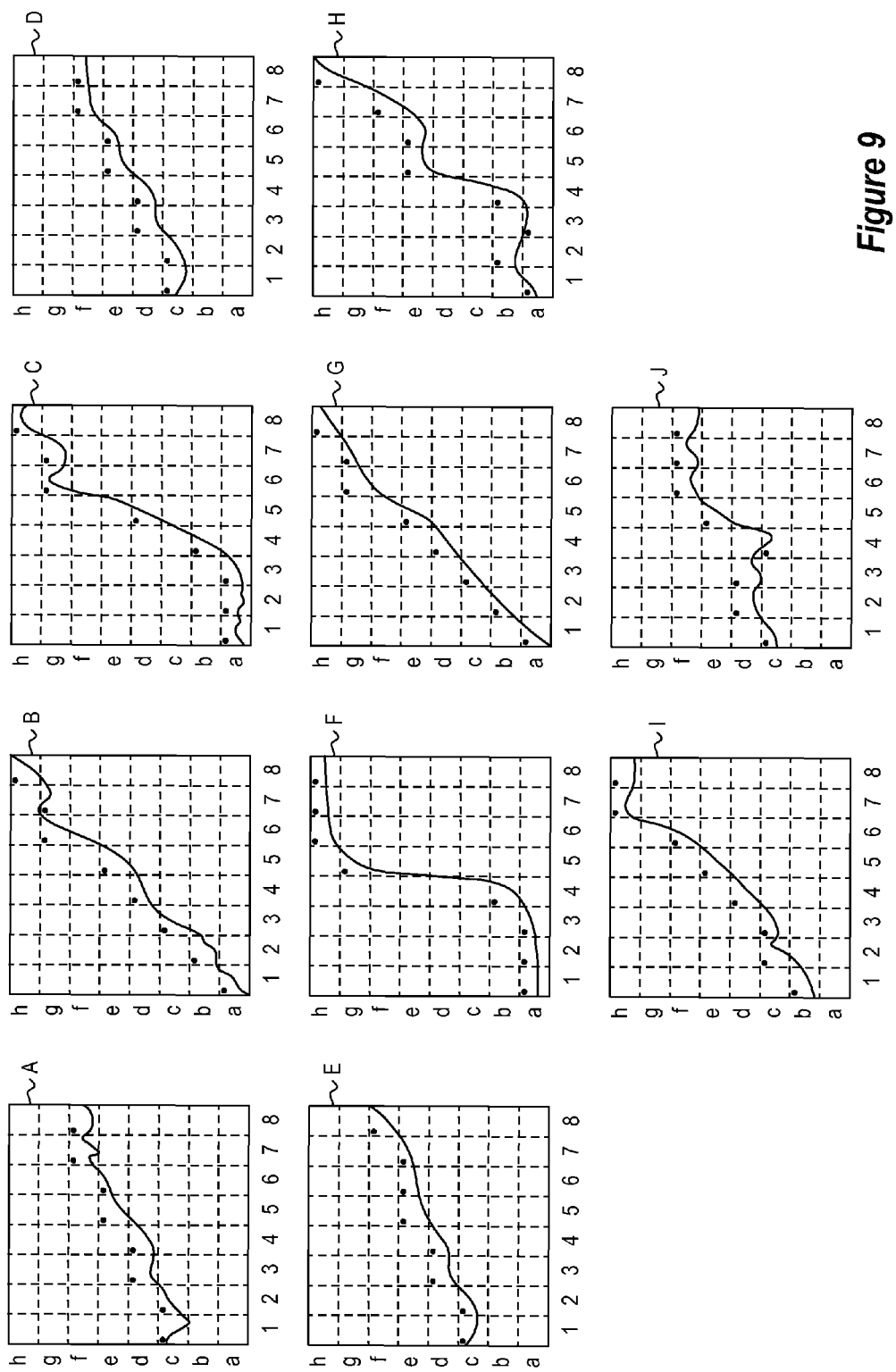
FIG. 9 illustrates the line pattern representations of FIG. 8 segmented into eight segments and ranged into eight ranges.

Referring again to FIG. 6, the segmentation component 602 accesses the line pattern representations (as represented by arrow 622) in FIG. 6, and segments each the line pattern representation into multiple segments along the second dimension (reference act 702 of FIG. 7). The segmentation component 602 also may divide the first dimension of each line pattern representation into multiple ranges (reference act 703 of FIG. 7). For instance, FIG. 9 illustrates the same line pattern representations A though J of FIG. 8, except that the line pattern representations are shown as segmented and ranged. In the case of FIG. 9, there are eight segments 1 through 8 and eight ranges "a" through "h", although the granularity of the segmentation may be selected otherwise.

The encoding component 603 access the segmented and ranged line pattern representation (as represented by arrow 623) in FIG. 6, and assigns a quantized value to each of the segments for each of the line pattern representations based on the changing value in the first dimension as present within the corresponding segment (reference act 704 of FIG.

7). For instance, in FIG. 9, the line pattern of line pattern representation A has a value that generally falls in range "c" within segment 1, in range "c" within segment 2, in range "d" within segment 3, in range "d" within segment 4, in range "e" within segment 5, in range "e" within segment 6, in range "f" within segment 7, and in range "f" within segment 8. Accordingly, the line pattern representation might be encoded with the sequence "ccddeeff", labeling the applicable ranges from left to right as the line pattern moves through the segments 1 through 8 in order.

The assignment of the range within which the line pattern falls for a given segment may be a relatively straightforward calculation in order to allow the matching process of act 202 to be efficient so that even large data sets may be quickly processed for auto-completion. As an example, the mean of the line pattern within the corresponding segment may be calculated, and the identifier for the range within which that mean falls will be assigned for that segment. However, the principles described herein are not limited to how the range identifier for any given segment is identified.

As for the line pattern of line pattern representation B in FIG. 9, the mean of the line pattern falls in range "a" within segment 1, in range "b" within segment 2, in range "c" within segment 3, in range "d" within segment 4, in range "e" within segment 5, in range "g" within segment 6, in range "g" within segment 7, and in range "h" within segment 8. Accordingly, the line pattern representation might be encoded with the sequence "abcdeggh", labeling the applicable ranges from left to right as the line pattern moves through the segments 1 through 8 in order. For reader reference, a dot is placed in the upper left corner of the applicable range for each segment of each line pattern representation A through J shown in FIG. 9. This may continue for all line pattern representations A through J of FIG. 9 to encode the line patterns as shown in the following Table 1:

TABLE 1

| Line Pattern Representation Identifier | Encoded Representation |
|---|---|
| A | ccddeeff |
| B | abcdeggh |
| C | aaabdggh |
| D | ccddeeff |
| E | ccddeeef |
| F | aaabghhh |
| G | abcdeggh |
| H | ababeefh |
| I | bccdefhh |
| J | cddcefff |

The encoded representation of the line pattern representations may then be saved (as represented by arrow 624) to the collection so that they may be matched against input partial line patterns input by the user.

Now suppose that the user enters the first eighth (corresponding to segment A) of the input line pattern, and that portion falls within the range "c". In that case, if a "match" of the input line pattern involves an exact match with the encoded representation for the portion of the input line pattern entered so far, then (referring to FIG. 9 and Table 1), there are four matching line pattern representations A, D, E and J that the user might be intending to reference. Accordingly, at this point, there might be four completion options corresponding to each of these matching line pattern representations shown in the user interface.

Now suppose that the user enters the second eighth (corresponding to segment B) of the input line pattern, and that portion again falls within the range "c". At this point, the encoding of the input partial line pattern would be "cc". Referring to FIG. 9 and Table 1), there are three matching line pattern representations A, D and E that the user might be intending to reference. Accordingly, at this point, there might be three completion options corresponding to each of these matching line pattern representations shown in the user interface. As this updated matching operation may occur quite quickly, the user might observe pattern J falling off as a completion option at substantially the same time as writing the second eighth of the input line pattern.

Now suppose that the user enters the third through fifth eighths (corresponding to segments C through E) of the input line pattern, and those portions fall within the range "d", "d" and "e", respectively. At this point, the encoding of the input partial line pattern would be "ccdde". Referring to FIG. 9 and Table 1, there are still three matching line pattern representations A, D and E that the user might be intending to reference. Accordingly, at this point, there might be three completion options corresponding to each of these matching line pattern representations shown in the user interface. Now suppose that at this point the user selects the completion option corresponding to pattern E. The system may respond by selecting the line pattern representation E itself for further processing.

Accordingly, the principles described herein provide an effective mechanism for receiving user input of a line pattern, and presenting auto-completion options to the user based on a collection of line pattern representations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable hardware storage devices having thereon computer-executable instructions that are executable by one or more processors of a computing system to cause the computing system to autocomplete an input partial line pattern in response to detecting the input partial line pattern entered by a user by at least causing the computing system to implement:

an act of detecting an input partial line pattern being input by a user;

an act of displaying the input partial line pattern on a display, the input partial line pattern extending from a first end to a second end across a display region having a first dimension and a second dimension;

an act of encoding the input partial line pattern by segmenting the input partial line pattern into a plurality of segments along the second dimension and assigning an encoding value to each segment, the encoding value for each segment corresponding to a first dimension position of the input partial line pattern at that segment;

an act of matching a scope of the input partial line pattern against a corresponding scope of each of a plurality of line pattern representations to find a scope matched set that includes one or more matched line pattern representations, the act of matching including comparing the encoding values of the input partial line pattern to corresponding encoding values of each of the plurality of line pattern representations and placing the one or more matched line pattern representations into the scope matched set upon determining that each of the one or more matched line pattern representations includes at least the encoding values of the input partial line pattern;

an act of visualizing one or more completion options for the input partial line pattern based on one or more of the matched line pattern representations of the scope matched set;

an act of detecting further user input forming an updated input partial line pattern, the updated input partial line pattern modifying the scope matched set; and an act of updating the visualized plurality of completion options in response to the detected further user input, the updated visualized plurality of completion options being based on one or more corresponding line pattern representations of the modified scope matched set.

2. The computer program product in accordance with claim 1, wherein the one or more completion options are each represented by displaying the one or more corresponding line pattern representations of the scope matched set within a same portion of the display as the input partial line pattern, and wherein the one or more completion options are rendered as beginning at and extending from the second end of the input partial line pattern.

3. The computer program product in accordance with claim 1, wherein the one or more completion options are represented by displaying the one or more corresponding line pattern representations of the scope matched set within a distinct portion of the display as compared to the portion of the display in which the input partial line pattern is displayed.

4. The computer program product in accordance with claim 1, wherein the one or more completion options are selectable such that when selected, the corresponding line pattern representation is also selected.

5. A method, implemented at a computer system that includes one or more processors, for autocompleting an input partial line pattern in response to detecting the input partial line pattern entered by a user, the method comprising:

an act of detecting an input partial line pattern being input by a user;

an act of displaying the input partial line pattern on a display, the input partial line pattern extending from a first end to a second end across a display region having a first dimension and a second dimension;

an act of encoding the input partial line pattern by segmenting the input partial line pattern into a plurality of segments along the second dimension and assigning an encoding value to each segment, the encoding value for each segment corresponding to a first dimension position of the input partial line pattern at that segment;

an act of matching a scope of the input partial line pattern against a corresponding scope of each of a plurality of line pattern representations to find a scope matched set that includes one or more matched line pattern representations, the act of matching including comparing the encoding values of the input partial line pattern to corresponding encoding values of each of the plurality of line pattern representations and placing the one or more matched line pattern representations into the scope matched set upon determining that each of the one or more matched line pattern representations includes at least the encoding values of the input partial line pattern;

an act of visualizing one or more completion options for the input partial line pattern based on one or more of the matched line pattern representation of the scope matched set;

an act of detecting further user input forming an updated input partial line pattern, the updated input partial line pattern modifying the scope matched set; and an act of updating the visualized plurality of completion options in response to the detected further user input, the updated visualized plurality of completion options being based on one or more corresponding line pattern representations of the modified scope matched set.

6. The method in accordance with claim 5, wherein the one or more completion options are represented by displaying the one or more corresponding line pattern representation of the scope matched set within a distinct portion of the display as compared to the portion of the display in which the input partial line pattern is displayed.

7. The method in accordance with claim 5, wherein the one or more completion options are represented by displaying the one or more corresponding line pattern representations of the scope matched set within a same portion of the display as the input partial line pattern, and wherein the one or more completion options are rendered as beginning at and extending from the second end of the input partial line pattern and extending to a point not coinciding with the first end of the input partial line pattern.

8. The method in accordance with claim 5, further comprising:

an act of detecting that the user has selected at least one of the one or more completion options.

9. The method in accordance with claim 8, further comprising:

an act of selecting the corresponding line pattern representation in response to detecting that the user has selected at least one of the one or more completion options.

10. The method in accordance with claim 5, wherein each line pattern representation in the plurality of line pattern representations is segmented into a plurality of segments along the second dimension and each is encoded into an encoded representation by assigning a value to each of the plurality of segments based on a first dimension position of the segment.

11. The method in accordance with claim 5, wherein the act of matching further includes determining that each of the one or more matched line pattern representations includes at least the encoding values of the input partial line pattern in the same sequential order as the encoding values of the input partial line pattern.

12. The method in accordance with claim 5, wherein the act of matching further includes determining one or more non-matching line pattern representations upon determining that the encoding values of the input partial line pattern are not the same as the corresponding encoding values of the one or more non-matching line pattern representation.

13. The method in accordance with claim 5, wherein detecting the further user input includes detecting further user input adding to the input partial line pattern to form the updated input partial line pattern.

14. The method in accordance with claim 13, wherein updating the visualized plurality of completion options includes reducing the number of visualized completion options based on the detected further user input adding to the input partial line pattern.

15. The method in accordance with claim 5, wherein updating the visualized plurality of completion options includes reducing the number of visualized completion options based on the detected further user input.

16. The method in accordance with claim 5, wherein the visualized plurality of completion options is updated at substantially a same time as the further user input is detected.

17. A computer system, comprising:
one or more processors; and
one or more computer-readable hardware storage devices having stored thereon computer-executable instructions that are executable by the one or more processors to cause the computer system to autocomplete an input partial line pattern in response to detecting the input partial line pattern entered by a user, and further to cause the computer system to perform at least the following:
an act of detecting an input partial line pattern being input by a user;
an act of displaying the input partial line pattern on a display, the input partial line pattern extending from a first end to a second end across a display region having the first dimension and a second dimension;
an act of encoding the input partial line pattern by segmenting the input partial line pattern into a plurality of segments along the second dimension and assigning an encoding value to each segment, the encoding value for each segment corresponding to a first dimension position of the input partial line pattern at that segment;
an act of comparing a scope of the input partial line pattern against a scope of each of a plurality of line pattern representations to find a scope matched set that includes one or more matched line pattern representations, the act of matching including comparing the encoding values of the input partial line pattern to corresponding encoding values of each of the plurality of line pattern representations and placing the one or more matched line pattern representations into the scope matched set upon determining that each of the one or more matched line pattern representations includes at least the encoding values of the input partial line pattern;
an act of visualizing one or more completion options for the input partial line pattern based on one or more of the matched line pattern representations of the scope matched set;
an act of detecting further user input forming an updated input partial line pattern, the updated input partial line pattern modifying the scope matched set; and
an act of updating the visualized plurality of completion options in response to the detected further user input, the updated visualized plurality of completion options being based on one or more corresponding line pattern representations of the modified scope matched set.

18. The computer system in accordance with claim 17, wherein the act of visualizing occurs immediately after the scope matched set is generated without requiring a user selection of the completion option.

19. The computer system in accordance with claim 17, wherein the act of visualizing further includes rendering the input partial line pattern simultaneously with a plurality of different completion options corresponding to a plurality of different line pattern representations that are rendered as extending from the end of the input partial line pattern.

* * * * *